United States Patent Office.

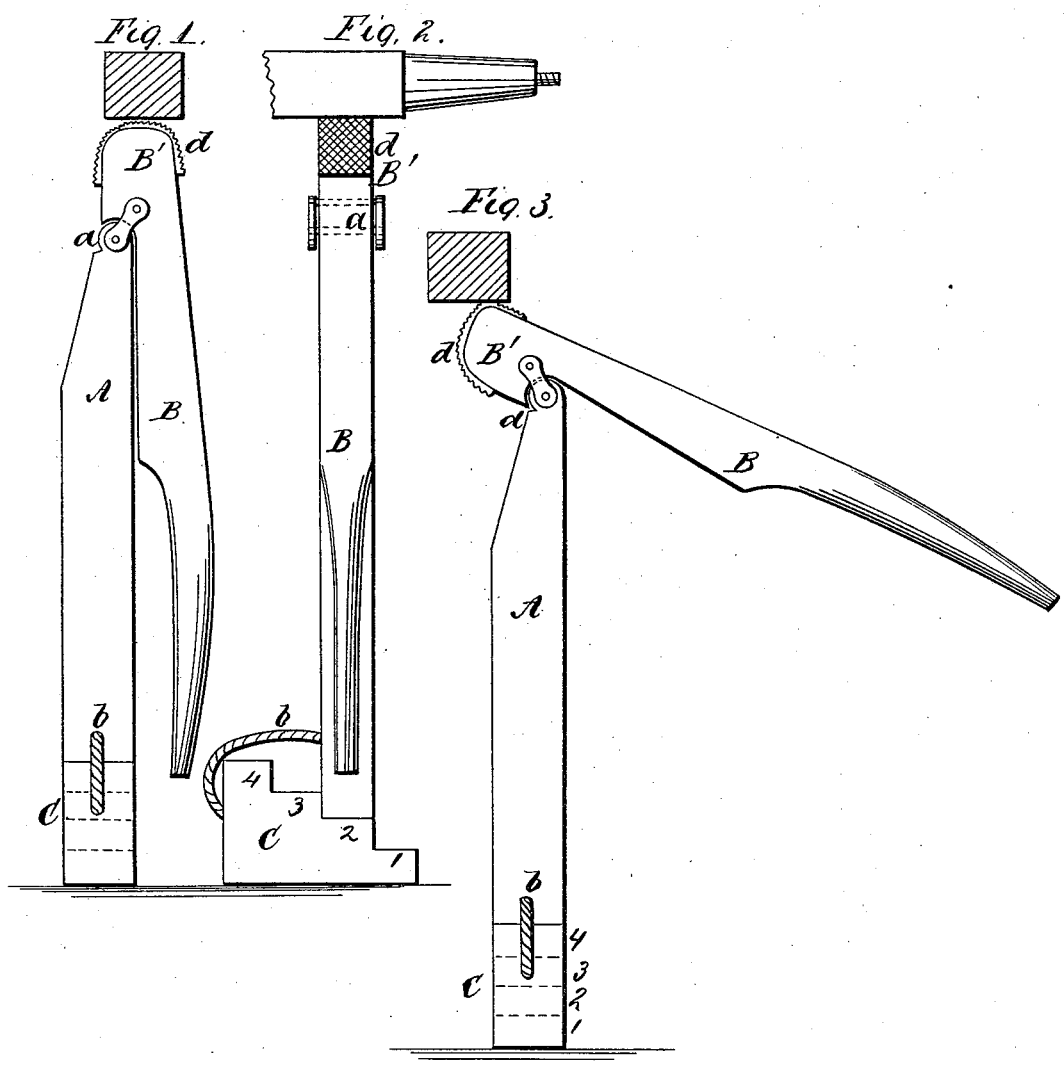

J. N. PARKER, OF DARLINGTON, WISCONSIN.

Letters Patent No. 68,230, dated August 27, 1867.

IMPROVEMENT IN LIFTING-JACK.

The Schedule referred to in these Letters Patent and making part of the same.

TO ALL WHOM IT MAY CONCERN:

Be it known that I, J. N. PARKER, of Darlington, in the county of Lafayette, and State of Wisconsin, have invented a new and useful Improvement in Lifting Jack; and I do hereby declare that the following is a full, clear, and exact description thereof, which will enable those skilled in the art to make and use the same, reference being had to the accompanying drawings, forming part of this specification, in which—

Figure 1 is a side view of my invention in the position for holding up the axle of a wagon.

Figure 2 is a front view in the same position.

Figure 3 is a side view in the position before lifting.

Similar letters of reference indicate corresponding parts.

This invention relates to a new and useful improvement in the construction of a jack for lifting the axles of wagons for the purpose of taking off the wheel, and consists in a standard connected with a lever, and also a graduated step-block for the standard to stand upon at different elevations, according to the height of the axle from the ground. The device is very simple and easily managed, and is much cheaper than the ordinary wagon-jack.

A is a standard, made of wood, about twenty inches long, on the upper end of which a lever, B, of about the same length, is connected by a knuckle-joint, $a$, the short arm of the lever forming a head, B', which is covered with an iron band, $d$, made rough on the surface to prevent slipping when the axle of a wagon is lifted, as shown in the drawings. C represents a block of wood, on one side of which are made three or four steps, 1, 2, 3, 4, upon one of which the foot of the standard A is placed in order to lengthen it more or less, as required, to suit the height of the axle from the ground. The block C may be attached to the standard A by a rope or chain, $b$, if desired.

When the axle of a wagon is to be lifted, the standard A is placed upright on the ground, or standing on one of the steps of the block C, when necessary, with the head B' under the axle, and the lever B raised, as seen in fig. 3. The axle is then lifted by depressing the lever and closing it against the standard A, as shown in figs. 1 and 2. The centre of gravity will then tend to keep the lever closed, so that the jack can stand alone and support the axle while a wheel is being removed.

Having thus described my invention, what I claim as new, and desire to secure by Letters Patent, is—

The standard A, to which the lever B, provided with the head B', covered with a roughened iron band, $d$, is pivoted by a knuckle-joint, $a$, all constructed and arranged as described, and adapted to be supported upon the graduated block C, as herein shown and represented.

J. N. PARKER.

Witnesses:
    H. C. NASH,
    B. H. PADDOCK.